US00RE45431E

(19) United States
(12) Reissued Patent
King et al.

(10) Patent Number: US RE45,431 E
(45) Date of Reissued Patent: *Mar. 24, 2015

(54) ENERGY STORAGE SYSTEM FOR ELECTRIC OR HYBRID VEHICLE

(71) Applicant: General Electric Company, Schenectady, NY (US)

(72) Inventors: Robert Dean King, Schenectady, NY (US); Timothy Gerard Richter, Wynantskill, NY (US); Lembit Salasoo, Schenectady, NY (US)

(73) Assignee: General Electric Company, Schenectady, NY (US)

( * ) Notice: This patent is subject to a terminal disclaimer.

(21) Appl. No.: 13/681,686

(22) Filed: Nov. 20, 2012

Related U.S. Patent Documents

Reissue of:
(64) Patent No.: 7,489,048
Issued: Feb. 10, 2009
Appl. No.: 11/327,954
Filed: Jan. 9, 2006

U.S. Applications:
(63) Continuation of application No. 13/025,102, filed on Feb. 10, 2011, now Pat. No. Re. 43,956, which is an application for the reissue of Pat. No. 7,489,048.

(51) Int. Cl.
*H02P 1/00* (2006.01)

(52) U.S. Cl.
USPC ..... 307/10.1; 307/52; 320/104; 318/139

(58) Field of Classification Search
USPC ..... 307/9.1, 10.1, 71, 52; 320/104; 318/139
See application file for complete search history.

(56) References Cited

U.S. PATENT DOCUMENTS 4,004,208 A 1/1977 Tamminen
4,139,812 A 2/1979 Huggins (Continued)

FOREIGN PATENT DOCUMENTS

DE 10317093 11/2004
DE 10317093 A1 11/2004

(Continued)

OTHER PUBLICATIONS

Newnes Dictionary of Electronics, 1999, 4th Edition, pp. 227, 289.*

(Continued)

*Primary Examiner* — Daniel Cavallari
(74) *Attorney, Agent, or Firm* — Ziolkowski Patent Solutions Group, SC; Jean K. Testa

(57) ABSTRACT

A battery load leveling system for an electrically powered system in which a battery is subject to intermittent high current loading, the system including a first battery, a second battery, and a load coupled to the batteries. The system includes a passive storage device, a unidirectional conducting apparatus coupled in series electrical circuit with the passive storage device and poled to conduct current from the passive storage device to the load, the series electrical circuit coupled in parallel with the battery such that the passive storage device provides current to the load when the battery terminal voltage is less than voltage on the passive storage device, and a battery switching circuit that connects the first and second batteries in either a lower voltage parallel arrangement or a higher voltage series arrangement.

27 Claims, 8 Drawing Sheets

(56) References Cited

U.S. PATENT DOCUMENTS

| | | | | |
|---|---|---|---|---|
| 4,412,137 | A * | 10/1983 | Hansen et al. | 307/10.6 |
| 4,533,011 | A | 8/1985 | Heidemeyer et al. | |
| 4,862,009 | A | 8/1989 | King | |
| 4,926,104 | A | 5/1990 | King et al. | |
| 5,168,975 | A | 12/1992 | Bernhardt et al. | |
| 5,345,154 | A | 9/1994 | King | |
| 5,373,195 | A | 12/1994 | De Doncker et al. | |
| 5,418,444 | A * | 5/1995 | Cook et al. | 320/125 |
| 5,488,283 | A * | 1/1996 | Dougherty et al. | 307/10.1 |
| 5,589,743 | A | 12/1996 | King | |
| 5,710,699 | A | 1/1998 | King et al. | |
| 5,713,425 | A | 2/1998 | Buschhaus et al. | |
| 5,722,502 | A | 3/1998 | Kubo | |
| 5,723,956 | A | 3/1998 | King et al. | |
| 5,903,449 | A | 5/1999 | Garrigan et al. | |
| 6,170,587 | B1 | 1/2001 | Bullock | |
| 6,186,255 | B1 | 2/2001 | Shimasaki et al. | |
| 6,227,997 | B1 | 5/2001 | Fujisawa et al. | |
| 6,258,006 | B1 | 7/2001 | Hanyu et al. | |
| 6,319,168 | B1 | 11/2001 | Morris et al. | |
| 6,323,608 | B1 * | 11/2001 | Ozawa | 318/139 |
| 6,331,365 | B1 * | 12/2001 | King | 429/9 |
| 6,332,257 | B1 | 12/2001 | Reed, Jr. et al. | |
| 6,342,775 | B1 * | 1/2002 | Sleder, Sr. | 320/116 |
| 6,360,834 | B1 | 3/2002 | Gauthier | |
| 6,373,152 | B1 * | 4/2002 | Wang et al. | 307/150 |
| 6,401,850 | B1 | 6/2002 | Bowen | |
| 6,441,581 | B1 | 8/2002 | King et al. | |
| 6,478,705 | B1 | 11/2002 | Holmes et al. | |
| 6,481,517 | B1 | 11/2002 | Kobayashi et al. | |
| 6,486,568 | B1 | 11/2002 | King et al. | |
| 6,497,974 | B2 * | 12/2002 | Fuglevand | 429/22 |
| 6,507,128 | B2 | 1/2003 | King et al. | |
| 6,533,692 | B1 | 3/2003 | Bowen | |
| 6,533,693 | B2 | 3/2003 | Bowen et al. | |
| 6,569,055 | B2 | 5/2003 | Urasawa et al. | |
| 6,583,523 | B1 * | 6/2003 | Bhate | 307/86 |
| 6,592,484 | B1 | 7/2003 | Tsai et al. | |
| 6,603,215 | B2 | 8/2003 | Kuang et al. | |
| 6,604,591 | B2 | 8/2003 | Bowen et al. | |
| 6,624,535 | B2 * | 9/2003 | Morrow | 307/71 |
| 6,645,105 | B2 | 11/2003 | Kima | |
| 6,650,091 | B1 * | 11/2003 | Shiue et al. | 320/166 |
| 6,679,799 | B2 | 1/2004 | Bowen | |
| 6,729,423 | B2 | 5/2004 | Kobayashi et al. | |
| 6,737,822 | B2 | 5/2004 | King | |
| 6,784,563 | B2 | 8/2004 | Nada | |
| 6,817,432 | B2 | 11/2004 | Kitada et al. | |
| 6,837,816 | B2 | 1/2005 | Tsai et al. | |
| 6,915,220 | B2 | 7/2005 | Cardinal et al. | |
| 6,930,404 | B1 * | 8/2005 | Gale et al. | 290/40 C |
| 7,109,686 | B2 * | 9/2006 | Schulte et al. | 320/167 |
| 7,233,474 | B2 * | 6/2007 | Brown et al. | 361/104 |
| 7,352,084 | B2 * | 4/2008 | Hall et al. | 307/104 |
| 7,439,631 | B2 | 10/2008 | Endou | |
| 7,723,954 | B2 | 5/2010 | Frucht | |
| 2004/0251880 | A1 * | 12/2004 | O'Brien | 320/166 |
| 2005/0093370 | A1 * | 5/2005 | Amano et al. | 307/10.1 |
| 2005/0211480 | A1 * | 9/2005 | Kejha | 180/65.2 |
| 2006/0127704 | A1 * | 6/2006 | Raiser | 429/9 |
| 2006/0133007 | A1 * | 6/2006 | Shiue et al. | 361/301.2 |
| 2006/0164034 | A1 * | 7/2006 | Hanyu et al. | 320/104 |
| 2007/0132313 | A1 * | 6/2007 | Baeuerle | 307/10.1 |

FOREIGN PATENT DOCUMENTS

| | | | |
|---|---|---|---|
| JP | 04-271209 | A | 9/1992 |
| JP | 05-236608 | A | 9/1993 |
| JP | 11-252711 | A | 9/1999 |
| JP | 2003-219566 | A | 7/2003 |
| JP | 2004-282800 | A | 10/2004 |
| WO | WO2004/102768 | | 11/2004 |
| WO | WO 2004102768 | A1 * | 11/2004 |

OTHER PUBLICATIONS

JP Office Action dated Jan. 15, 2013 from corresponding JP Application No. 2008-549486.

PCT/US2006/048133 dated Jul. 31, 2007.

* cited by examiner

ENERGY STORAGE SYSTEM FOR ELECTRIC OR HYBRID VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*Notice: More than one reissue application has been filed for the reissue of U.S. Pat. 7,489,048. The reissue application numbers are Ser. Nos. 13/025,102 and 13/681,686 (the present application). Reissue application Ser. No. 13/681,686, filed on Nov. 20, 2012 is a continuation reissue application of application Ser. No. 13/025,102, filed on Feb. 10, 2011, which is an application for reissue of U.S. Pat. No. 7,489,048, filed on Jan. 9, 2006, which are incorporated herein by reference.*

BACKGROUND OF THE INVENTION

This invention relates generally to electric drive systems and, more particularly, to a battery load leveling system that may be utilized with a hybrid or an electric vehicle.

At least one known vehicle includes batteries, typically lead-acid batteries, to provide electric power for vehicle propulsion. For example, FIG. 1 is a prior art vehicle that includes a conventional alternating current (AC) electric propulsion system 10 that is used in electric propelled and also hybrid-electric vehicles. The electric propulsion system includes at least one energy storage unit such as a lead acid battery 12, and a direct current (DC) contactor 14 to electrically disconnect the energy storage unit 12 from a traction inverter 16 via a DC link 18. Specifically, the battery 12 is connected to a DC link which connects to a frequency controlled inverter such as traction DC-AC inverter 16 for controlling power to an AC motor 20.

In the operation of the vehicle, the battery is often called upon to deliver short bursts of power at high current levels, typically during acceleration of the vehicle or while operating the vehicle up a steep grade, for example. When high current is drawn from conventional batteries, battery terminal voltage drops. Such voltage reduction can interfere with proper operation of the vehicle or reduce efficiency of the switching devices in the power control circuit since the control circuit must also be designed to operate at high efficiency at full battery voltage, i.e., when the vehicle is drawing nominal current in a constant speed mode.

One method for reducing the effect of high current requirements on electric drive system batteries is to use an auxiliary passive energy storage device coupled to the DC link to provide additional power during high current situations. One implementation of this method is shown in the prior art FIG. 2. Specifically, FIG. 2 illustrates an energy storage system 30 that includes a traction battery 32 and an ultracapacitor 34, and a relatively low-cost ultracapacitor electronic interface 36 that allows the ultracapacitor 34 to share power with the traction battery 32 during vehicle acceleration and other high power demands while climbing steep grades.

During operation, when the known vehicle is operated during a lower power cruise condition, a diode 40 allows the ultracapacitor voltage to remain at a slightly higher voltage than the battery voltage. Immediately after the high power acceleration is complete, the required current from the energy storage system substantially decreases and the battery voltage increases to the nominal battery voltage or possibly higher voltages, while the ultracapacitor remains at approximately the voltage immediately after the acceleration. Moreover, when the vehicle is decelerating, a silicon-controlled rectifier 42 is gated and the regenerative energy from the electric motor 44 and associated traction drive 46 initially charges the ultracapacitor 34 until the voltage increases to a point where the diode 40 conducts, at which point both the ultracapacitor 34 and battery 32 are partially recharged. As such, the known energy storage system functions quite well and also provides an efficient and low-cost interface between the ultracapacitor and the traction battery in low speed electric vehicles, including golf cars and small utility vehicles. However, during operation, the amount of energy stored in the ultracapacitor 34 is limited by the square of the voltage difference between the maximum battery voltage plus the voltage drop across the diode 40, and the minimum battery voltage plus the voltage drop across the diode 40.

As a result, known energy storage systems are less effective for providing relatively high power levels over an extended period of time while the vehicle is either accelerating under heavy loads and/or climbing steep grades. Moreover, known energy systems include an electronic interface that may be less effective in matching the ultracapacitor output voltage with the voltage level required for the traction drive with acceptable efficiency and at a reasonable cost.

BRIEF DESCRIPTION OF THE INVENTION

In one aspect, a battery load leveling system for an electrically powered system in which a battery is subject to intermittent high current loading is provided. The system includes a first battery, a second battery, and a load coupled to the batteries. The system also includes a passive storage device, a unidirectional conducting apparatus coupled in series electrical circuit with the passive storage device and poled to conduct current from the passive storage device to the load, the series electrical circuit coupled in parallel with the battery such that the passive storage device provides current to the load when the battery terminal voltage is less than voltage on the passive storage device, and a battery switching circuit that connects the first and second batteries in either a lower voltage parallel arrangement or a higher voltage series arrangement.

In another aspect, an electric vehicle is provided. The electric vehicle includes a first battery, a second battery, a load coupled to the first and second batteries; the first and second batteries configured to provide the propulsive force for moving the vehicle, and a battery load leveling system. The battery load leveling system includes a passive storage device, a unidirectional conducting apparatus coupled in series electrical circuit with the passive storage device and poled to conduct current from the passive storage device to the load, the series electrical circuit coupled in parallel with at least one of the first and second batteries such that the passive storage device provides current to the load when the battery terminal voltage of at least one of the first and second batteries is less than voltage on the passive storage device, and a battery switching circuit that connects the first and second batteries in either a lower voltage parallel arrangement or a higher voltage series arrangement.

In a further aspect, a hybrid vehicle is provided. The hybrid vehicle includes a first battery, a second battery, a load coupled to the first and second batteries; the first and second batteries configured to provide the propulsive force for moving the vehicle, and a battery load leveling system. The battery load leveling system includes a passive storage device, a unidirectional conducting apparatus coupled in series electrical circuit with the passive storage device and poled to conduct current from the passive storage device to the load, the series electrical circuit coupled in parallel with at least one of the first and second batteries such that the passive storage device provides current to the load when the battery terminal voltage of at least one of the first and second batteries is less than voltage on the passive storage device, and a battery switching circuit that connects the first and second batteries in either a lower voltage parallel arrangement or a higher voltage series arrangement.

In a further aspect, a method of assembling a battery load leveling system for an electrically powered system in which a battery is subject to intermittent high current loading is provided. The system includes a first battery, a second battery, and a load coupled to the first and second batteries. The method includes coupling a unidirectional conducting apparatus in a series electrical circuit with a passive storage device such that the unidirectional conducting apparatus is poled to conduct current from the passive storage device to a load, coupling the series electrical circuit in parallel with the first and second batteries such that said passive storage device provides current to the load when the battery terminal voltage is less than voltage on the passive storage device, and utilizing a battery switching circuit to the first and second batteries in either a lower voltage parallel arrangement or a higher voltage series arrangement.

DETAILED DESCRIPTION OF THE INVENTION

Figure 3:
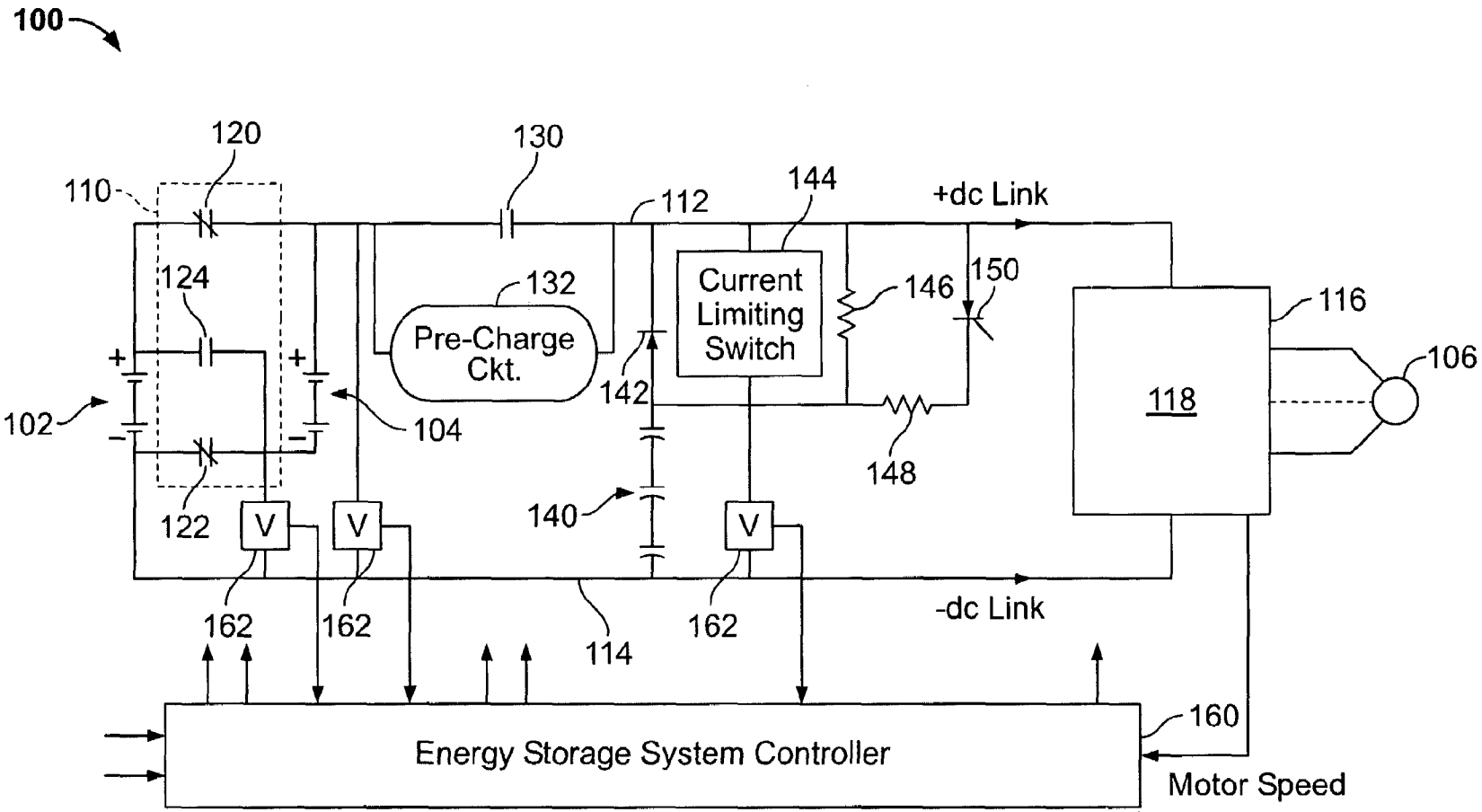
FIG. 3 is a battery load leveling system including an exemplary battery switching circuit.

FIG. 3 illustrates a battery load leveling system 100. The battery load leveling system 100 includes a first battery 102 and a second battery 104 that are utilized to supply power to a load 106. Load 106 may be an alternating current (AC) or direct current (DC) load such as an electric traction motor for powering electric vehicles. Battery load leveling system 100 also includes a battery switching circuit 110 that includes a plurality of contactors that are operable to connect the first and second batteries 102 and 104, respectively, in either a lower voltage parallel or a higher voltage series arrangement.

Battery switching circuit 110 enables the positive and negative terminals of first battery 102 and second battery 104 to be connected to respective ones of a positive bus 112 and negative bus 114. Positive and negative buses 112 and 114, also referred to herein as the positive and negative DC links, couple batteries 102 and 104 to a power electronics circuit 116 which may include a switching regulator 118 such as a DC-to-AC inverter for supplying alternating current to an AC load or AC motor, or a DC chopper or pulse width modulation circuit (not shown) for providing direct current to a DC load or DC motor.

More specifically, battery switching circuit 110 includes a first contactor 120 that is coupled between the positive terminal of first battery 102 and the positive bus 112, a second contactor 122 that is coupled between the negative terminal of the first battery 102 and the negative terminal of the second battery 104, and a third contactor 124 that is coupled between the positive terminal of the first battery 102 and the negative terminal of the second battery 104.

To operate battery load leveling system 100 in a lower voltage parallel arrangement, contactors 120 and 122 are closed and contactor 124 is opened such that batteries 102 and 104 are electrically coupled in a parallel arrangement to buses 112 and 114, respectively. Optionally, to operate battery load leveling system 100 in a higher voltage series arrangement, contactors 120 and 122 are opened and contactor 124 is closed such that batteries 102 and 104 are electrically coupled in a series arrangement to buses 112 and 114, respectively.

Battery load leveling system 100 also includes a main contactor 130 that is coupled in series between the outputs of batteries 102 and 104 and power electronics circuit 116 and a pre-charge circuit 132. Battery load leveling system 100 also includes a passive storage device 140, such as an ultracapacitor for example, that is wired in series with a unidirectional conducting apparatus 142, such as a diode for example, a current limiting switch 144, a first resistor 146, a second resistor 148, and a semiconductor switch 150 such as, but not limited to a silicon-controlled rectifier, a bipolar transistor, a Metal Oxide Semiconductor Field Effect Transistor (MOSFET), and a Gate Turnoff Thyristor (GTO). An energy storage system controller 160 responsive to a throttle or brake command generated by the operator provides control signals over a control link to power electronic circuit 118. Ultracapacitor as used herein is comprised of multiple series connected capacitor cells where each ultracapacitor cell has a capacitance that is greater than 100 Farads. In the exemplary embodiment, the ultracapacitors described herein have a cell capacitance that is greater than 1000 Farads per cell.

Figure 1:
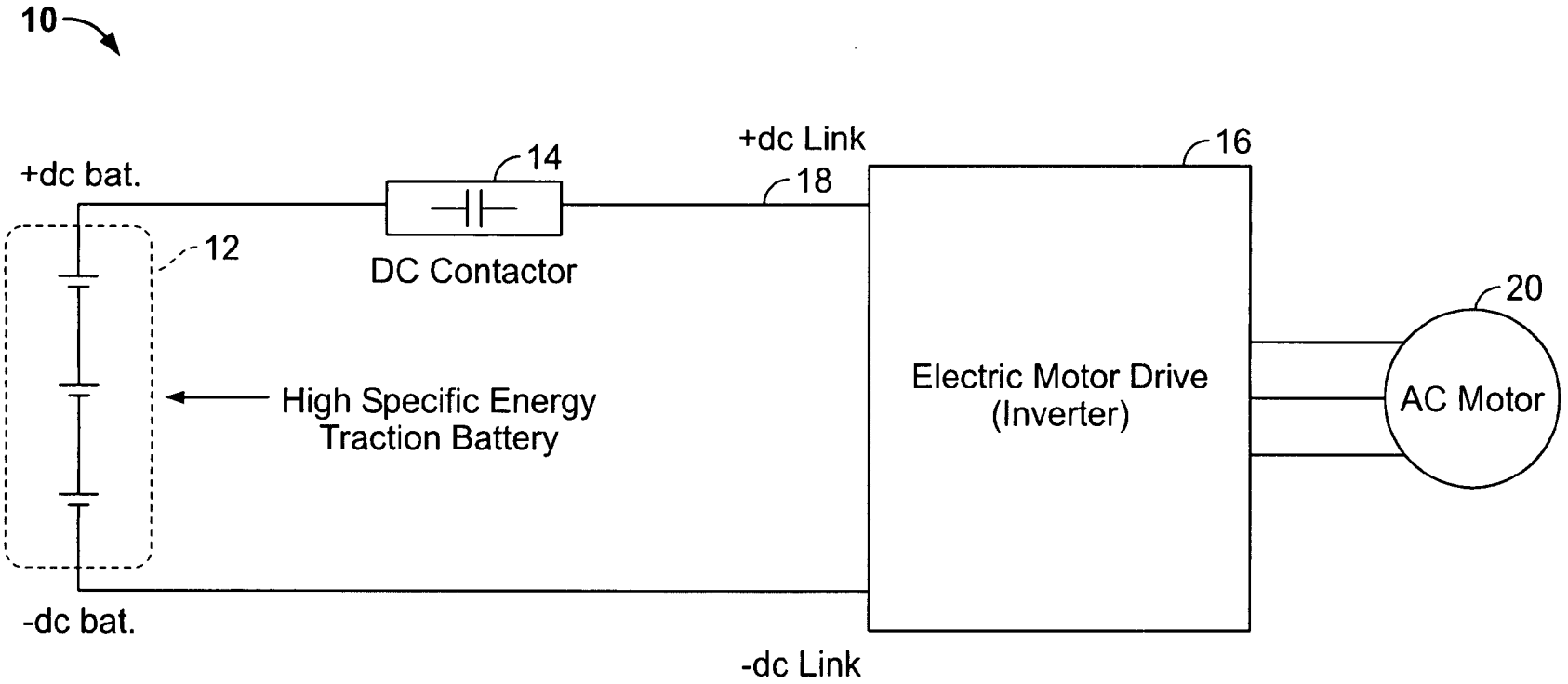
FIG. 1 (Prior Art)
FIG. 1 is prior art electric propulsion system.
Figure 2:
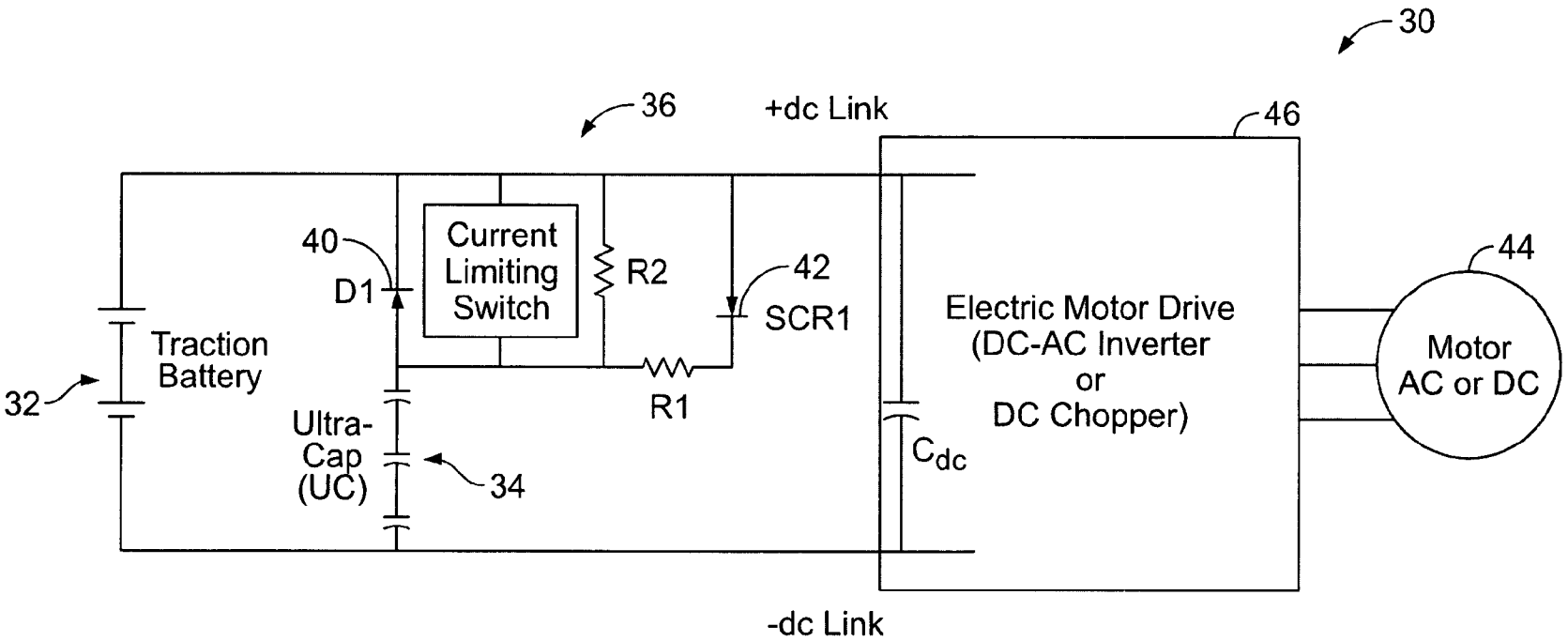
FIG. 2 (Prior Art)
FIG. 2 is a prior art energy storage system.

As such, battery load leveling system 100 is operable in either a higher voltage series arrangement or a lower voltage parallel arrangement. For example, at low traction drive motor speeds, the battery switching circuit 110 is configured in the lower voltage parallel mode, i.e. contactors 120 and 122 are both closed and contactor 124 is open. As such, the batteries 102 and 104 are coupled in parallel to buses 112 and 114, respectively. Approximately simultaneously, the passive storage device 140, e.g. the ultracapacitor initially starts to pre-charge via the current limiting switch 144. More specifically, resistor 146, given sufficient time, allows the ultracapacitor 140 to be charged to a maximum of within a diode drop of the battery terminal voltage, i.e. the combined voltages of batteries 102 and 104 arranged in a series or parallel configuration. Alternatively, especially in a hybrid vehicle, the drive system initially could function on the battery energy storage alone and the ultracapacitor 140 can be pre-charged during vehicle deceleration using the vehicles's kinetic energy or regenerative power during operation of motor 106 as a generator through inverter 118 through SCR 150 and current limiting resistor 148. Pre-charge circuit 132 is utilized to charge the DC link filter capacitor, contained within the traction drive system 118 as shown in FIG. 2, thereby reducing the transient current stress on the main DC contactor 130.

Specifically, the current limiting switch 144 is sensitive to current amplitude, and is selected to have a relatively low resistance at low current and a high resistance to high current. Accordingly, when load 106 is drawing a nominal amount of current, batteries 102 and 104 provide charging current for passive storage device 140 through the relatively low impedance of current limiting switch 144 without dissipating excessive power in the resistance of switch 144. However, if energy storage device 140 has been deeply discharged so that its voltage is substantially less than the nominal combined battery voltages, increased current drawn through current limiting switch 144 will cause the switch 144 to transition into a relatively high resistance state selected to be substantially greater than the resistance of fixed resistor 146.

Accordingly, the ultracapacitor or passive energy storage device 144 will be recharged by current through resistance 146. Preferably, the ohmic value of resistance 146 is selected to provide a current level that will recharge the capacitor 144 in approximately thirty to sixty seconds, depending upon battery conditions. Current limiting apparatus 144 thus provides improved load leveling of the batteries by preventing high current recharge of ultracapacitor 140 from the batteries 102 and 104 immediately after the system experiences high power pulse loads due to heavy current draw in load 106 such as would be occasioned by rapid vehicle acceleration where load 106 comprises an AC or DC electric motor. The design of current limiting switch 144 is selected such that the switch does not oscillate as the ultracapacitor 140 charge current exponentially decreases with increasing voltage on the ultracapacitor.

Moreover, in one embodiment, the energy storage system controller (ECSS) may be a processor that utilizes feedback signals from a plurality of relative low-cost voltage sensors 162 and conventional contactor driver circuits coupled to contactors 120, 122, and 124, to facilitate operating contactors 120, 122, and 124, respectively. As such, when the vehicle is operating at a relatively low speed, the parallel contactors, 120 and 122, are configured as "normally closed" with the assumption that the traction drive spends the majority of the time operating at a relatively low speed, as typical in stop and go driving for utility delivery vehicle applications. Logic in the energy storage system controller 160 also provides sufficient sequencing "lockouts" and appropriate time delays to enable the "parallel" mode contactors, 120 and 122 to be opened prior to the "series" mode contactor 124 being closed, and visa-versa.

More specifically, when the vehicle is operated in a regenerative mode, e.g. during light braking for example, battery load leveling system 100 is configured such that the main contactor 130 is opened after initially being in the "parallel mode" during periods of moderate regenerative energy capture that is based on the level of operator input brake commands.

Additionally, when operating the batteries in relative low power parallel mode, the SCR 150 is gated "on" allowing current to flow through current limiting resistor 148 to charge the ultracapacitor 140, thus allowing the voltage on the ultracapacitor 140 to increase substantially above the battery voltage thereby providing an increased level of energy storage compared to the known configuration illustrated in FIG. 2. Provided that the voltage on the ultracapacitor 140 is less than a predetermined threshold voltage of the nominal voltage in the "series mode", the main contactor 130 remains open to allow a portion of the energy stored in ultracapacitor 140 to be utilized during the next acceleration event. At a point where the voltage difference between the parallel battery arrangement, e.g. 102 and 104 are arranged in a parallel, and the ultracapacitor 140 is within a predetermined voltage level, the ECSS 160 issues a command to close the main contactor 130. Similarly, during operation at light regenerative energy capture, the ESSC ensures that the main contactor 130 remains closed to facilitate increasing the life of the mechanical contactor. Additional control details are described with reference to FIG. 8.

The battery load leveling system 100 shown in FIG. 3 allows an increased level of energy storage within the ultracapacitor, compared to the prior art as shown in FIG. 2 with the assumption that the nominal voltage of both the battery, in the series configuration, and the ultracapacitor, are the same voltage rating. Moreover, battery load leveling system 100 provides a relatively low-cost implementation that provides partial decoupling of the traction battery from the DC link and therefore increases the overall drive system efficiency.

Figure 4:
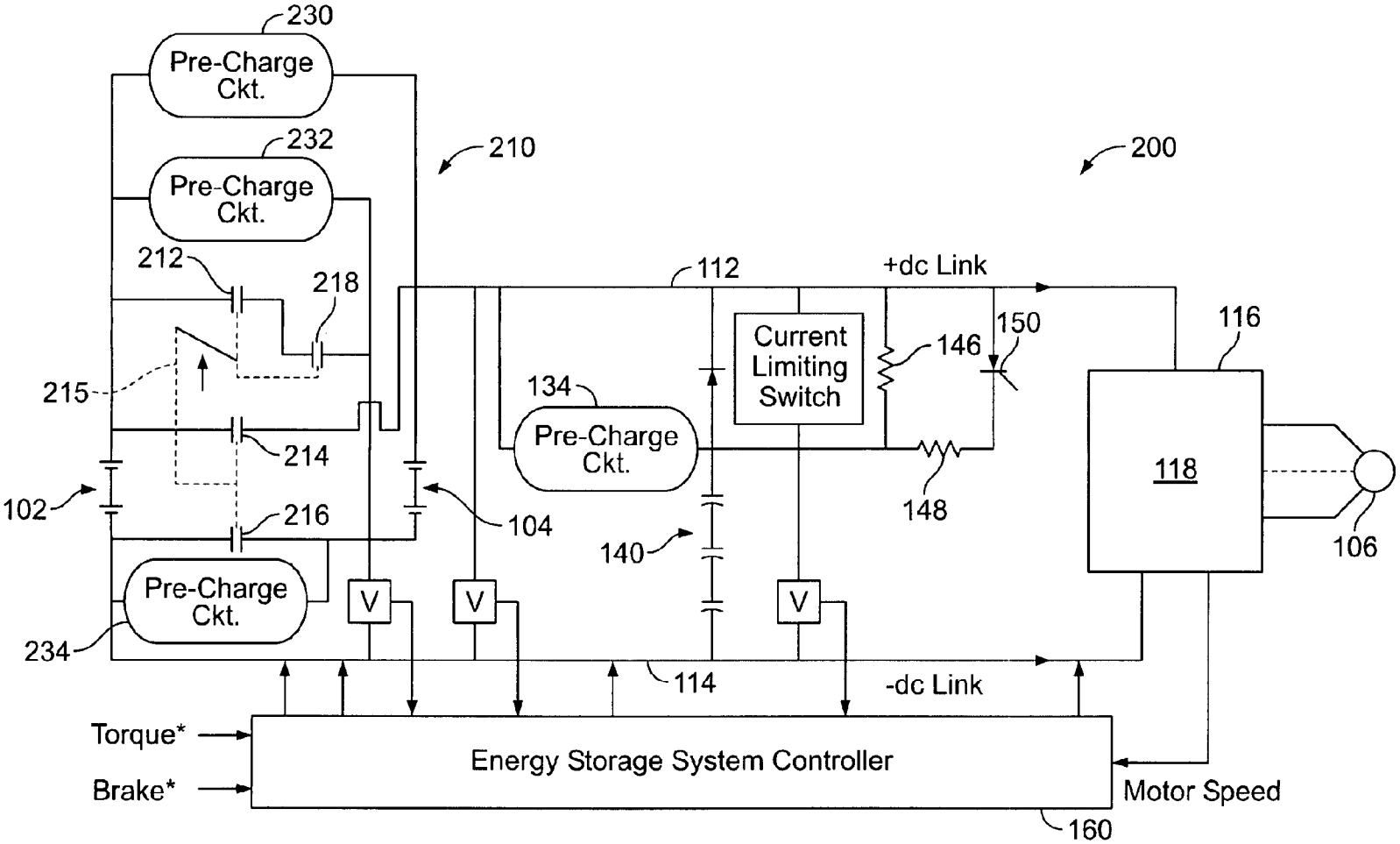
FIG. 4 is an exemplary battery switching circuit which may be used with the battery load leveling system shown in FIG. 3.

FIG. 4 is a system 200 that includes a battery switching circuit 210. System 200 is substantially similar to battery load leveling system 100 with the exception of battery switching circuit 210. In the exemplary embodiment, circuit 210 is a series/parallel circuit that allows the main contactor 130 (shown in FIG. 3) to be eliminated. Circuit 210 includes a first contactor 212, a second contactor 214, a third contactor 216, and a fourth contactor 218 that are each normally open contactors.

Specifically, contactors 212 and 218 are coupled in series to facilitate reducing the voltage across the individual contactors. Optionally, circuit 210 includes a single contactor that includes a sufficient voltage rating such that at least one of the contactors 212 or 218 may be eliminated, and this simplification is included in this embodiment. In the exemplary embodiment, circuit 210 also includes a mechanical interlock 215 to facilitate preventing both series and parallel contactors from closing simultaneously, in the remote situation where the ESSC logic, electrical noise on the gate driver commands, and/or contact welding prevents one of the sets of contactors from opening.

More specifically, first and fourth contactors 212 and 218 are coupled in series between the positive terminal of first battery 102 and the negative terminal of the second battery 104, second contactor 214 is coupled between the positive terminal of first battery 102 and the positive bus 112, and third contactor 216 is coupled between the negative terminal of the first battery 102 and the negative terminal of the second battery 104.

System 200 also includes a first precharge circuit 230, a second precharge circuit 232, and a third precharge circuit 234 that are utilized to precharge the DC link filter capacitor located within the DC-AC inverter 118, (similar function as the precharge circuit 132 in FIG. 3) thus reducing the current stress on the contactors and DC link filter capacitor during transient operation while closing contactors 212, 214, 216, and 218, respectively. Fourth precharge circuit 134 is an optional circuit that allows precharge of ultracapacitor 140 from the battery system in a shorter time compared to the current limited switch and resistor 146 as discussed previously.

To operate system 200 in a lower voltage parallel arrangement, mechanical interlock 214 is positioned in a first position such that contactors 212 and 218 are open and such that contactors 214 and 216 are closed. As such, batteries 102 and 104 are coupled in parallel to provide power to bus 112. To operate system 200 in a higher voltage series arrangement, mechanical interlock 214 is positioned in a second position such that contactors 212 and 218 are closed and such that contactors 214 and 216 are open. As such, batteries 102 and 104 are coupled in series to bus 112.

Moreover, the pre-charge circuit 230, 232, and 234 are utilized to pre-charge the DC link capacitor, $C_{dc}$, (shown on FIG. 2) that is housed within the electric motor traction drive or DC Load. Control of this embodiment is similar to the control of battery load leveling system 100 shown in FIG. 3 and will be discussed later herein.

Figure 5:
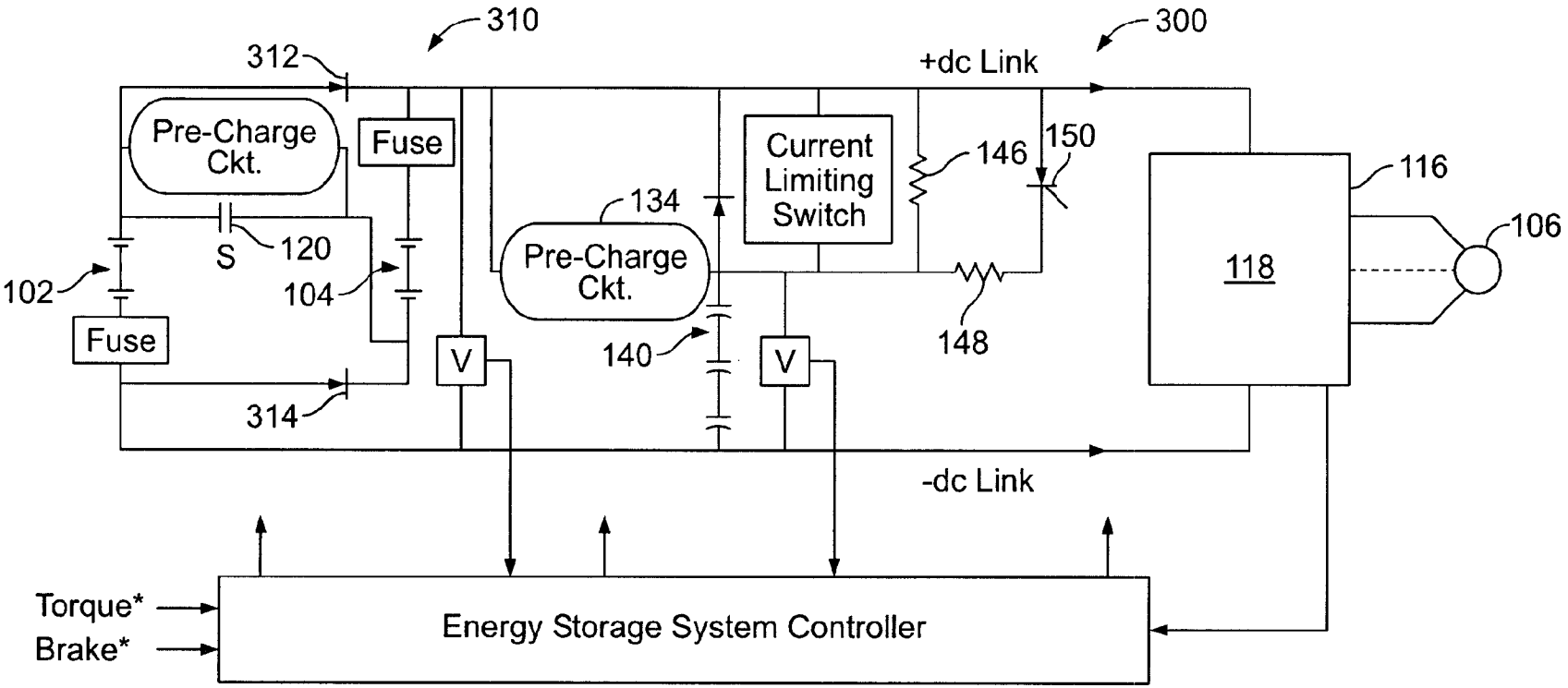
FIG. 5 is an exemplary battery switching circuit which may be used with the battery load leveling system shown in FIG. 3.

FIG. 5 illustrates a system 300 that includes a battery switching circuit 310. System 300 is substantially similar to battery load leveling system 100 with the exception of battery switching circuit 310. In the exemplary embodiment, the parallel contactors 214 and 216 (shown in FIG. 4) are replaced with diodes 312 and 314 respectively.

During acceleration or operation at relatively constant speed and low motor speed operation, the series contactor 120 is open and the batteries 102 and 104 are configured in a parallel arrangement via diodes 312 and 314. As such, the power required to accelerate or operate at nearly constant speed is provided to the electric motor drive or load 106 by a combination of the batteries 102 and 104 and the ultracapacitor 140, as shown in FIGS. 3 and 4. Optionally, during vehicle deceleration, regenerative power is blocked from flowing into the batteries 102 and 104 by the diodes 312 and 314, and therefore the regenerative energy is captured in the ultracapacitor 140. As such, the voltage of the ultracapacitor 140 increases approximately linearly as a function of the regenerative current that flows through SCR 150 and current limiting resistor 148. For high levels of regenerative power, i.e. during vehicle operation on a long down-hill grade, the voltage on the ultracapacitor 140 will increase substantially. As the ultracapacitor voltage rises to within a predetermined voltage of the projected battery voltage in the series configuration, contactor 120 is closed and the regenerative power is now applied to both the batteries 102 and 104 (arranged in a series configuration) and the ultracapacitor 140.

Figure 6:
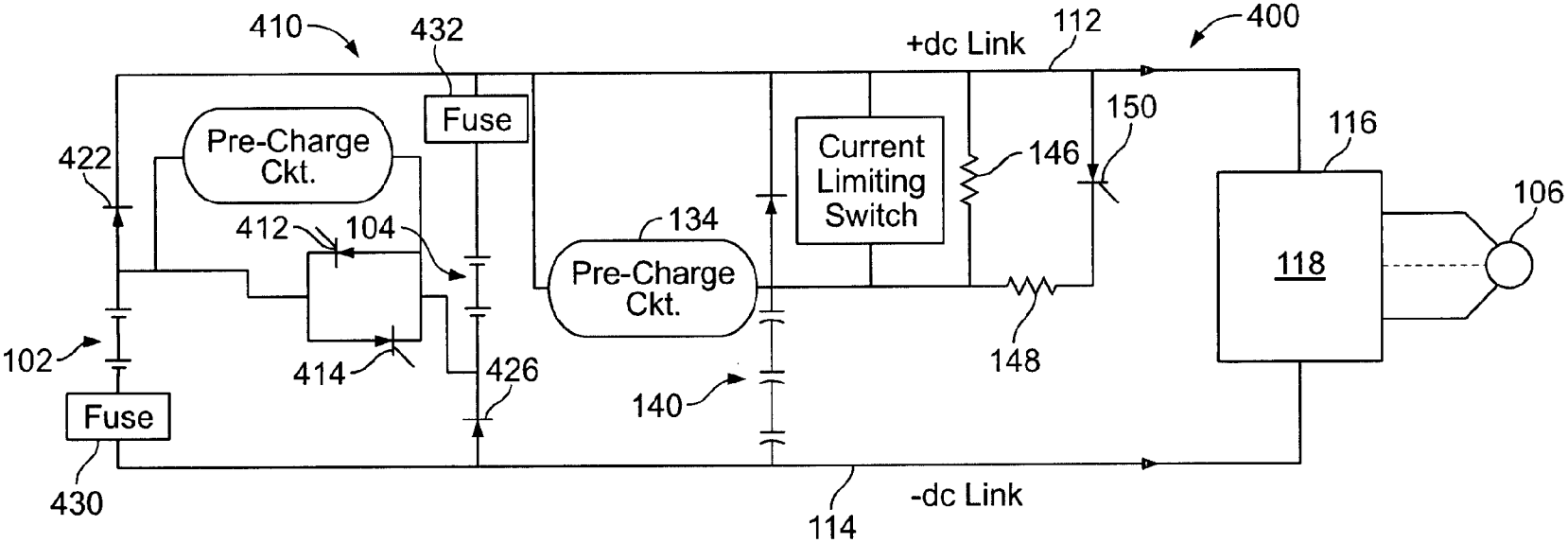
FIG. 6 is an exemplary battery switching circuit which may be used with the battery load leveling system shown in FIG. 3.

FIG. 6 is a system 400 that includes a battery switching circuit 410. System 400 is substantially similar to system 300 with the exception of battery switching circuit 410. In the exemplary embodiment, the function of the electrical disconnect, i.e. series contactor 120 shown in FIG. 5, is implemented utilizing back-to-back SCR's 412 and 414, respectively. Optionally, circuit 410 includes at least two fuses 430 and 432 to facilitate limiting the current from batteries 102 and 104, respectively.

During operation, when the vehicle is accelerating or climbing a relatively steep hill and additional power is required, SCR 414 is activated such that first battery 102 and second battery 104 are placed in a series arrangement between buses 112 and 114, respectively. Additionally, a fuse 432 facilitates limiting the current to bus 112.

When the vehicle is operating a mode wherein less power is required, both SCR 412 and SCR 414 are deactivated such that first battery 102 and second battery 104 are placed in a parallel arrangement between buses 112 and 114, respectively. Specifically, current from first battery 102 is channeled through a diode 422 and fuse 430 to first bus 112, and current is channeled from second battery 104 through diode 426 and fuse 432 to bus 112 to power load 106

Optionally, when the vehicle is descending a relatively steep incline the vehicle is configured to operate in a regeneration mode. Specifically, SCR 412 is activated and SCR 414 is deactivated such that current flows from bus 112 through fuse 432 through battery 104 through SCR 412 through first battery 102 through fuse 430 to complete the electrical circuit to bus 114 and thus facilitates charging both the first battery 102 and second battery 104 connected in a series arrangement. Diodes 422 and 426 restrict current from being channeled to the first and second batteries in a parallel arrangement.

Figure 7:
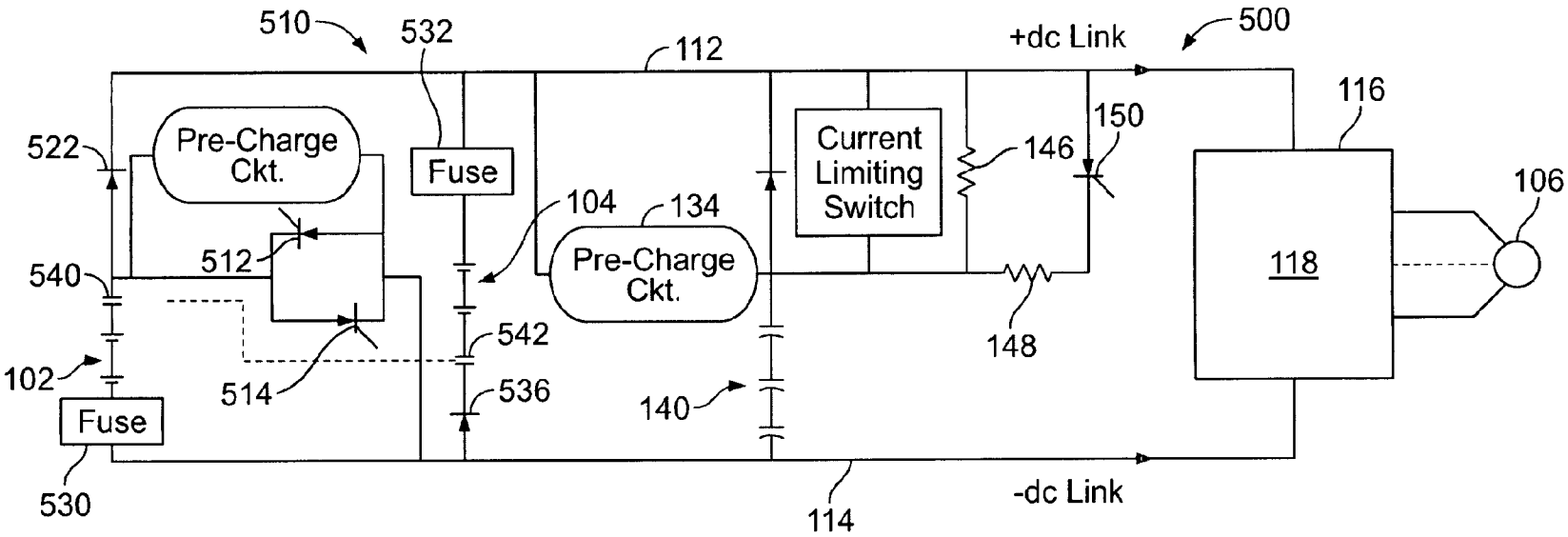
FIG. 7 is an exemplary battery switching circuit which may be used with the battery load leveling system shown in FIG. 3.

FIG. 7 is a system 500 that includes a battery switching circuit 510. System 500 is substantially similar to system 400 with the exception of battery switching circuit 510. In the exemplary embodiment, circuit 510 also includes a first contactor 540 and a second contactor 542. In the exemplary embodiment, the function of the electrical disconnect, i.e. series contactor 120 shown in FIG. 5, is implemented utilizing back-to-back SCR's 512 and 514, respectively. Optionally, circuit 510 includes at least two fuses 530 and 532 to facilitate limiting the current from batteries 102 and 104, respectively. Circuit 510 also includes a first contactor 540 and a second contactor 542 that facilitate allowing galvanic isolation and to also facilitate preventing leakage current flowing through batteries 102 and 104 while the battery temperature is low and in the "frozen state". As used herein the batteries are operating in a froze state when the operational temperature of the battery is less than approximately 140 degrees Celsius.

In the exemplary embodiment, batteries 102 and 104 are implemented using at least one of a sodium nickel chloride battery or a sodium sulfur battery that are each configured to operate at a temperature that is greater than 260 degrees Celsius. In the exemplary embodiment, the sodium nickel chloride battery and the sodium sulfur battery each have a high specific energy that is greater than approximately 100 Watt/hours per kilogram. Moreover, the batteries are relatively inexpensive and may be effectively cooled utilizing ambient air conditions, such as air or water cooling, for example.

In another embodiment, batteries 102 and 104 are implemented using a fuel cell, a nickel metal hydride battery, a lithium ion battery, a lithium polymer battery, a nickel cadmium battery, and a lead acid battery. Moreover, although system 500 illustrates contactors 540 and 542 positioned on only one side of a respective battery 102 and 104, it should be realized that contactors may be coupled to both terminals of each respective battery 102 and 104 to provide further protection from the detrimental leakage current and are therefore also included in this embodiment.

In a first mode of operation operating the vehicle in a steep downhill grade for example, when the vehicle is reaching relatively high regenerative power levels, and/or operating over long distance such that the voltage on the series connected batteries reaches approximately the maximum limit, an over-voltage protection algorithm installed within the electric motor traction drive (not shown in above embodiments) gradually reduces the level of regenerative power while maintaining the DC link voltage, i.e. bus 112 voltage, at acceptable limits. As this occurs, the vehicle operator will sense a reduction in electrical braking torque and will compensate by depressing the brake pedal further, thus effectively increasing the mechanical braking power as the electrical braking power is reduced.

During operation, system 500 utilizes feedback indicative of the motor 106 speed and torque, ultracapacitor voltage, and battery voltage to operate system 500. Moreover, whenever possible, system 500 utilizes the energy stored within ultracapacitor 140 to supplement vehicle operation. For example, during heavy vehicle acceleration, batteries 102 and 104 are placed in series arrangement, the ultracapacitor 140 voltage is charged to within approximately a diode drop of the battery voltage, and both the ultracapacitor 140 and battery 102 and 104, share the power primarily based on the open circuit voltage and associated internal resistance of the battery 102 and 104 and ultracapacitor 140. Optionally, during low speed operation, batteries 102 and 104 are arranged in a parallel arrangement and regenerative energy capture allows the voltage on the ultracapacitor 140 to increase to levels above the (parallel configured) battery voltage. In this situation, the next acceleration uses stored energy from the ultracapacitor 140 until the ultracapacitor voltage is approximately equal to the battery voltage.

Figure 8:
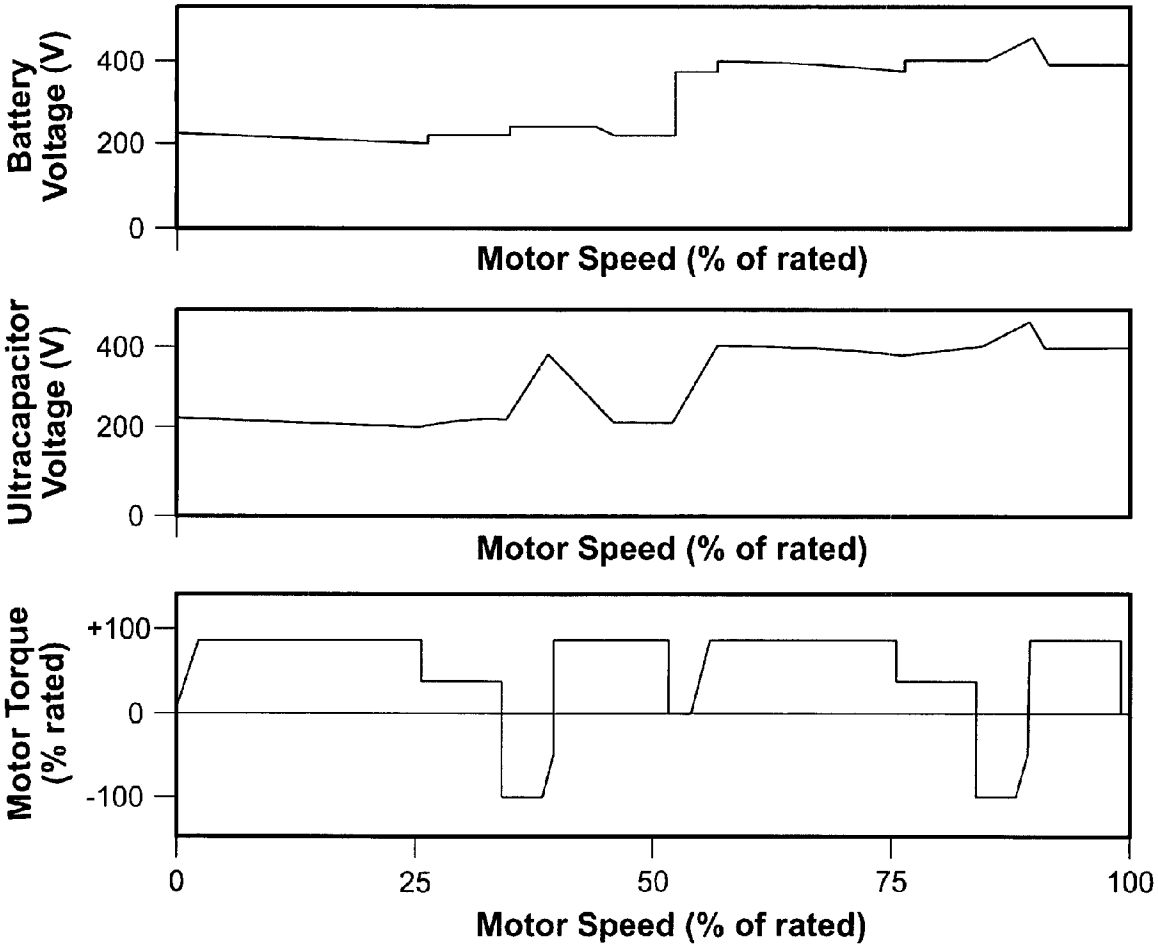
FIG. 8 is graphical illustration of the system shown in FIG. 3 during operation.

FIG. 8 is a graphical illustration of a method of controlling the systems shown in FIGS. 3-7. In the exemplary embodiment, the initial motor speed is shown to be approximately zero rpm and the ultracapacitor is pre-charged to essentially the battery voltage with the batteries configured in parallel. As shown, nearly constant torque is initially applied, the motor speed increases and power is supplied by both the parallel configured battery and the ultracapacitor. When the torque is suddenly decreased to approximately 30% of rated, i.e. the vehicle and/or drive is in the cruise mode, the battery voltage increases abruptly, while the ultracapacitor slowly increases due to either the current limited switch or the pre-charge circuit. However, during regenerative braking, the energy is applied to the ultracapacitor and the voltage increase is approximately a linear function of the regenerative brake current. For this example, the ultracapacitor voltage during the regenerative braking mode did not reach the voltage threshold where the Energy Storage System Controller commands the batteries to be configured in the series mode. Thus during the next acceleration, initially all of the energy to accelerate the drive and/or vehicle is supplied from the ultracapacitor. When the ultracapacitor voltage reaches a threshold voltage of the batteries in the parallel configuration, then power is smoothly transitioned and supplied by both the batteries and ultracapacitors.

At a point approximately 50% motor speed and above, the ultracapacitor voltage is increased. The exact method of increasing the voltage on the ultracapacitor is a function of the specific embodiment and application. In general the capacitor is either pre-charged from the batteries configured to the series configuration (shown in FIGS. 3-7), or by another source, including regenerative braking. During the period when the ultracapacitor voltage is lower than the battery voltage, the battery is supplying all of the power. In a hybrid vehicle, for example, a combination of engine power plus configuring the drive in a regenerative mode, could be used to reduce the time to recharge the ultracapacitor, compared to a conventional pre-charge circuit using the batteries alone. It is envisioned that the majority of the time the drive will be operating at lower speeds and therefore the frequency of this specific transition during full power is minimal. An alternative control technique is to have an automatic, computer controlled, algorithm that during highway mode type of operation, where the drive is routinely operated in the higher speed and power ranges, the control would force the batteries in the series configuration. Only after predetermined conditions, i.e. when the drive is again operated in a lower speed operation for a given length of time or distance, the automated control would switch the batteries back to the parallel configuration the next time the vehicle is stationary.

Although, FIG. 8 illustrates the system switching the batteries from a parallel arrangement to a series arrangement when the motor speed is approximately 50%, it should be realized that the systems described herein will reconfigure the batteries from a parallel mode to a series mode utilizing a plurality of inputs received from the system such as but not limited to, vehicle speed, motor torque, motor speed, and other inputs. As such, FIG. 8 is an exemplary embodiment, and it should be realized that the batteries may be switched from parallel to series or from series to parallel above 50% motor speed or below 50% motor speed.

Described herein is a plurality of energy storage systems that may be utilized with electric and/or hybrid vehicle which requires high power for acceleration and high energy to climb long grades. Hybrid vehicle as used herein represents a vehicle that utilizes a combination of an electric motor and a heat engine to provide propulsive force to the vehicle. Moreover, as used herein, an electric vehicle represents a vehicle that includes a motor and a plurality of batteries, wherein the batteries provide the provide the propulsive force to operate the vehicle.

The systems include combinations of high specific power ultracapacitors and high energy rechargeable batteries with high specific energy. The ultracapacitor is sized to provide sufficient power for initial acceleration and deceleration during stop and go urban driving and for short bursts of power during passing maneuvers. Moreover, a relatively low cost ultracapacitor electronic interface allows decoupling of the battery from the ultracapacitor during specific periods and therefore utilizes a higher percentage of the ultracapacitor's ideal stored energy, during regenerative energy capture. This stored energy is used during future accelerations, thus saving fuel and increasing range. The system described herein also allows for proper matching of the input voltage of the traction drive to efficiently operate for both low speed urban and high speed highway driving.

As such, the system described herein facilitates providing a low cost ultracapacitor/battery interface apparatus that does not require a relatively expensive DC-DC converter. The system is robust, reliable, and provides a smooth transition between battery switching events. The solid state battery switching circuits, contactors (if used) do not have high transient current stress. The system control is based on simple voltage, motor speed feedback sensors, and/or torque command signals. The ultracapacitor interface provides an increased utilization of energy storage compared to known interface techniques. Low speed urban driving type cycles may be run primarily using the ultracapacitor thus enhancing battery life. High specific power ultracapacitor component exhibits high round-trip efficiency. The ultracapacitor is essentially on the DC link to facilitate eliminating DC-DC converter losses. The combination of ultracapacitor and a battery provide sufficient energy storage that may be utilized during long up-hill and down-hill grades for both low speed and high speed operation. Moreover, the system also provides improved overall system round-trip efficiency, i.e. ultracapacitor, battery, and/or traction drive, especially during low motor speed operation when the DC link is operated at approximately 50% of rated voltage as compared to high-speed high-power operation.

While the invention has been described in terms of various specific embodiments, those skilled in the art will recognize that the invention can be practiced with modification within the spirit and scope of the claims.

What is claimed is:

[1. A battery load leveling system for an electrically powered system in which a battery is subject to intermittent high current loading, the electrically powered system including a first battery, a second, and a load coupled to the first and second batteries, said battery load leveling system comprising:

a passive electrical energy storage device;

a unidirectional electrical conducting apparatus coupled to the passive storage device and to the load, and the unidirectional electrical coupling apparatus configured to conduct current only from the passive storage device to the load, and the passive storage device is in parallel with the first and second batteries to the load; and a battery switching circuit that connects the first and second batteries in either a lower voltage parallel arrangement or a higher voltage series arrangement to allow a measurable terminal voltage of a circuit from the first and second batteries to the load to be switched from a first, higher voltage mode back and forth with a second lower voltage mode; and when the battery switching circuit is in the second lower voltage mode, then the terminal voltage of the circuit from the first and second batteries to the load also is less than a measurable voltage of the passive storage device to the load, and the passive storage device responds to the battery switching circuit being in the second lower voltage mode by supplying electrical current to the load; and further comprising a pre-charge circuit configured to charge said passive storage device using an external power source, wherein said external power source comprises a hybrid vehicle engine that charges said passive storage device through an electrical circuit with the drive configured to accept regenerative power from the load.]

[2. A battery load leveling system in accordance with claim 1 further comprising an electrical disconnect configured to disconnect said battery switching circuit from said passive storage device.]

[3. A battery load leveling system in accordance with claim 2 further comprising a controller to selectively operate said electrical disconnect based on the voltage of said passive storage device and direction and magnitude of power flow from the load.]

[4. A battery load leveling system in accordance with claim 1 wherein said battery switching circuit comprises a first contactor, a second contactor, and a third contactor, said first and second contactors operable to connect the first and second batteries in a lower voltage parallel arrangement, and said third contactor is operable to connect the first and second batteries in a higher voltage series arrangement.]

[5. A battery load leveling system in accordance with claim 4 further comprising:

a fourth contactor that is coupled in series with said first contactor;

a first apparatus for approximately simultaneously actuating said first and fourth contactors; and a second apparatus for approximately simultaneously actuating said second and third contactor.]

[6. A battery load leveling system in accordance with claim 5 wherein said second apparatus comprises a mechanical interlock that is coupled between said first and fourth contactors and said second and third contactors, said mechanical interlock configured to open said first and fourth contactors and approximately simultaneously close said second and third contactors to facilitate preventing a short circuit.]

[7. A battery load leveling system in accordance with claim 5 further comprising a mechanical interlock configured to prevent switching said first and second batteries from a parallel arrangement to a series arrangement in the event of a fault including welded contacts.]

[8. A battery load leveling system in accordance with claim 1 further comprising a first diode coupled in series with said first battery and a second diode coupled in series with said second battery such that when power flows from said first and second batteries to the load, said first and second batteries are arranged in the lower voltage parallel mode.]

[9. A battery load leveling system in accordance with claim 8 further comprising an electrical disconnect that electrically connects said first and second batteries in a higher voltage series mode for either direction of power flow or current flow from the load.]

[10. A battery load leveling system in accordance with claim 9 wherein said electrical disconnect is implemented using back-to-back silicon controlled rectifiers.]

[11. A battery load leveling system in accordance with claim 9 wherein said electrical disconnect is implemented using a solid state switch.]

[12. A battery load leveling system in accordance with claim 1 wherein said first and second batteries comprise at least one of a sodium nickel chloride battery and a sodium sulfur battery that are each operable at a temperature that is greater than 260 degrees Celsius.]

[13. A battery load leveling system in accordance with claim 12 further comprising at least one electrical disconnect coupled in series with one or both terminals of each of said first and second batteries to allow galvanic isolation and to prevent leakage current flowing through said first and second batteries when in a cold or frozen state.]

[14. A battery load leveling system in accordance with claim 1 further comprising a controller coupled to said battery switching circuit, said controller configured to connect said first and second batteries in either a lower voltage parallel arrangement or a higher voltage series arrangement based on at least one of a motor speed, a torque command, a passive storage device voltage, and a battery unit voltage.]

[15. A battery load leveling system in accordance with claim 1 wherein said first and second batteries comprise at least one of a sodium nickel chloride battery, a sodium sulfur battery, a fuel cell, a nickel metal hydride battery, a lithium ion battery, a lithium polymer battery, a nickel cadmium battery, and a lead acid battery.]

[16. A battery load leveling system in accordance with claim 1 wherein said unidirectional conducting apparatus comprises a diode.]

[17. An electric vehicle comprising a battery load leveling system as defined in claim 1.]

[18. A hybrid vehicle comprising: a battery load leveling system as defined in claim 1.]

[19. A battery load leveling system for an electrically powered system in which a battery is subject to intermittent high current loading, the electrically powered system including a first battery, a second, and a load coupled to the first and second batteries, said battery load leveling system comprising:

a passive electrical energy storage device;

a unidirectional electrical conducting apparatus coupled to the passive storage device and to the load, and the unidirectional electrical coupling apparatus configured to conduct current only from the passive storage device to the load, and the passive storage device is in parallel with the first and second batteries to the load; and a battery switching circuit that connects the first and second batteries in either a lower voltage parallel arrangement or a higher voltage series arrangement to allow a measurable terminal voltage of a circuit from the first and second batteries to the load to be switched from a first, higher voltage mode back and forth with a second lower voltage mode; and when the battery switching circuit is in the second lower voltage mode, then the terminal voltage of the circuit from the first and second batteries to the load also is less than a measurable voltage of the passive storage device to the load, and the passive storage device responds to the battery switching circuit being in the second lower voltage mode by supplying electrical current to the load; and further comprising a pre-charge circuit configured to charge said passive storage device using an external power source, wherein said pre-charge circuit is configured to accept regenerative power from the load using a semiconductor switch.]

[20. A battery load leveling system in accordance with claim 19 wherein said semiconductor switch comprises at least one of a silicon-controlled rectifier, a bipolar transistor, a Metal Oxide Semiconductor Field Effect Transistor (MOSFET) and a Gate Turnoff Thyristor (GTO).]

[21. A battery load leveling system for an electrically powered system in which a battery is subject to intermittent high current loading, the electrically powered system including a first battery, a second, and a load coupled to the first and second batteries, said battery load leveling system comprising:

a passive electrical energy storage device;

a unidirectional electrical conducting apparatus coupled to the passive storage device and to the load, and the unidirectional electrical coupling apparatus configured to conduct current only from the passive storage device to the load, and the passive storage device is in parallel with the first and second batteries to the load; and a battery switching circuit that connects the first and second batteries in either a lower voltage parallel arrangement or a higher voltage series arrangement to allow a measurable terminal voltage of a circuit from the first and second batteries to the load to be switched from a first, higher voltage mode back and forth with a second lower voltage mode; and when the battery switching circuit is in the second lower voltage mode, then the terminal voltage of the circuit from the first and second batteries to the load also is less than a measurable voltage of the passive storage device to the load, and the passive storage device responds to the battery switching circuit being in the second lower voltage mode by supplying electrical current to the load; and further comprising a pre-charge circuit configured to charge said passive storage device using an external power source, wherein said external power source comprises said first and second batteries, said battery switching circuit configured to couple said first and second batteries in either a lower voltage parallel arrangement or a higher voltage series arrangement.]

[22. A battery load leveling system in accordance with claim 21 further comprising an electrical disconnect configured to disconnect said battery switching circuit from said passive storage device.]

[23. A battery load leveling system in accordance with claim 22 further comprising a controller to selectively operate said electrical disconnect based on the voltage of said passive storage device and direction and magnitude of power flow from the load.]

[24. A battery load leveling system in accordance with claim 21 wherein said battery switching circuit comprises a first contactor, a second contactor, and a third contactor, said first and second contactors operable to connect the first and second batteries in a lower voltage parallel arrangement, and said third contactor is operable to connect the first and second batteries in a higher voltage series arrangement.]

[25. A battery load leveling system in accordance with claim 24 further comprising:

a fourth contactor that is coupled in series with said first contactor;

a first apparatus for approximately simultaneously actuating said first and fourth contactors; and a second apparatus for approximately simultaneously actuating said second and third contactor.]

[26. A battery load leveling system in accordance with claim 25 wherein said second apparatus comprises a mechanical interlock that is coupled between said first and fourth contactors and said second and third contactors, said mechanical interlock configured to open said first and fourth contactors and approximately simultaneously close said second and third contactors to facilitate preventing a short circuit.]

[27. A battery load leveling system in accordance with claim 25 further comprising a mechanical interlock configured to prevent switching said first and second batteries from a parallel arrangement to a series arrangement in the event of a fault including welded contacts.]

[28. A battery load leveling system in accordance with claim 21 further comprising a first diode coupled in series with said first battery and a second diode coupled in series with said second battery such that when power flows from said first and second batteries to the load, said first and second batteries are arranged in the lower voltage parallel mode.]

[29. A battery load leveling system in accordance with claim 28 further comprising an electrical disconnect that electrically connects said first and second batteries in a higher voltage series mode for either direction of power flow or current flow from the load.]

[30. A battery load leveling system in accordance with claim 29 wherein said electrical disconnect is implemented using back-to-back silicon controlled rectifiers.]

[31. A battery load leveling system in accordance with claim 29 wherein said electrical disconnect is implemented using a solid state switch.]

[32. A battery load leveling system in accordance with claim 21 wherein said first and second batteries comprise at least one of a sodium nickel chloride battery and a sodium sulfur battery that are each operable at a temperature that is greater than 260 degrees Celsius.]

[33. A battery load leveling system in accordance with claim 32 further comprising at least one electrical disconnect coupled in series with one or both terminals of each of said first and second batteries to allow galvanic isolation and to prevent leakage current flowing through said first and second batteries when in a cold or frozen state.]

[34. A battery load leveling system in accordance with claim 21 further comprising a controller coupled to said battery switching circuit, said controller configured to connect said first and second batteries in either a lower voltage parallel arrangement or a higher voltage series arrangement based on at least one of a motor speed, a torque command, a passive storage device voltage, and a battery unit voltage.]

*35. A load leveling system for an electrically powered system in which an energy storage unit is subject to an intermittent high current loading, the system including a first energy storage unit, a second energy storage unit, and a load coupled to the first and second energy storage units, the system comprising:*

*a passive storage device;*

*a unidirectional conducting apparatus coupled in a series circuit with the passive storage device and poled to conduct current from the passive storage device to the*

*load, the series circuit coupled in parallel with the first and second energy storage units;*

*a switching circuit that connects the first and second energy storage units in a lower voltage parallel arrangement and a higher voltage series arrangement; and*

*a controller configured to automatically switch the first and second energy storage units between the lower voltage parallel arrangement and the higher voltage series arrangement.*

*36. The load leveling system of claim 35 wherein at least one of the first and second energy storage units comprises one of a fuel cell, a sodium nickel chloride battery, a sodium sulfur battery, a lithium ion battery, a nickel metal hydride battery, a lithium polymer battery, a nickel cadmium battery, and a lead acid battery.*

*37. The load leveling system of claim 35 further comprising a main contactor in series between the load and the first and second energy storage units.*

*38. The load leveling system of claim 35 comprising a diode in series with at least one of the first and second energy storage units.*

*39. The load leveling system of claim 35 wherein, based on the parallel coupling of the series circuit with the first and second energy storage units, the passive storage device is caused to provide current to the load when a terminal voltage is less than a voltage on the passive storage device.*

*40. The load leveling system of claim 35 wherein the switching circuit comprises at least one semiconductor switch.*

*41. The load leveling system of claim 40 wherein the at least one semiconductor switch includes a silicon controlled rectifier.*

*42. The load leveling system of claim 35 wherein the controller is programmed to implement a time delay that causes a parallel mode contactor to be opened prior to a series mode contactor being closed.*

*43. The load leveling system of claim 35 wherein, in switching the first and second energy storage units between the lower voltage parallel arrangement and the higher voltage series arrangement, the controller is programmed to analyze a plurality of inputs received thereby, the plurality of inputs comprising a vehicle speed, a motor torque, and a motor speed.*

*44. The load leveling system of claim 35 comprising:*

*a switch that couples the load to the series circuit;*

*wherein the controller is programmed to activate the switch such that current flows from the load, when the electrically powered system is operated in a regenerative braking mode, to the passive storage device.*

*45. The load leveling system of claim 35 comprising a main contactor coupled between the first and second energy storage units and the load, wherein the controller is programmed to:*

*compare a voltage on the parallel arrangement to a voltage on the passive storage device; and*

*close the main contactor if the voltage on the parallel arrangement and the voltage on the passive storage device are within a predetermined voltage level of one another.*

*46. The load leveling system of claim 45 wherein the controller is configured to close the main contactor during regenerative braking of the electrically powered system.*

*47. The load leveling system of claim 35 wherein the controller is programmed to selectively maintain the parallel arrangement of the first and second energy storage units during a regenerative braking event of the electrically powered system.*

*48. A load leveling system for an electrically powered system in which an energy storage unit is subject to an intermittent high current loading, the system including a first energy storage unit, a second energy storage unit, and a load coupled to the first and second energy storage units, the system comprising:*

*a passive storage device;*

*a unidirectional conducting apparatus coupled in a series circuit with the passive storage device and poled to conduct current from the passive storage device to the load, the series circuit coupled in parallel with the first and second energy storage units; and*

*a switching circuit that connects the first and second energy storage units in a lower voltage parallel arrangement and a higher voltage series arrangement;*

*wherein the switching circuit is free of a mechanical switching device.*

*49. The load leveling system of claim 48 comprising a contactor and a diode in series with at least one of the first and second energy storage units.*

*50. The load leveling system of claim 48 wherein at least one of the first and second energy storage units comprises one of a fuel cell, a sodium nickel chloride battery, a sodium sulfur battery, a lithium ion battery, a nickel metal hydride battery, a lithium polymer battery, a nickel cadmium battery, and a lead acid battery.*

*51. The load leveling system of claim 48 wherein, based on the parallel coupling of the series circuit with the first and second energy storage units, the passive storage device is caused to provide current to the load when a terminal voltage is less than a voltage on the passive storage device.*

*52. The load leveling system of claim 48 comprising a controller configured to automatically switch the first and second energy storage units between the lower voltage parallel arrangement and the higher voltage series arrangement.*

*53. The load leveling system of claim 52 wherein, in switching the first and second energy storage units between the lower voltage parallel arrangement and the higher voltage series arrangement, the controller is programmed to analyze a plurality of inputs received thereby, the plurality of inputs comprising a vehicle speed, a motor torque, and a motor speed.*

*54. The load leveling system of claim 52 wherein the controller is programmed to implement a time delay that causes a parallel mode operation of the switching circuit to be implemented prior to a series mode operation of the switching circuit being closed.*

*55. The load leveling system of claim 52 comprising:*

*a switch that couples the load to the series circuit; and*

*wherein the controller is programmed to activate the switch such that current flows from the load, when the electrically powered system is operated in a regenerative braking mode, to the passive storage device.*

*56. The load leveling system of claim 52 further comprising a main contactor coupled between the load and the first and second energy storage units that is switchable between and open and closed position, wherein the controller is programmed to selectively operate the main contactor in the open and closed positions.*

*57. The load leveling system of claim 56 wherein the controller is programmed to:*

*determine an amount of regenerative braking of the electrically powered system; and*

*selectively open and close the main contactor responsive to the determined amount of regenerative braking of the electrically powered system.*

*58. The load leveling system of claim 52 wherein the controller is programmed to selectively maintain the lower voltage parallel arrangement of the first and second energy storage units during regenerative braking of the electrically powered system.*

*59. A load leveling system for an electrically powered system in which an energy storage unit is subject to an intermittent high current loading to supply power to a load, the system including a first energy storage unit, a second energy storage unit, and a motor coupled to the first and second energy storage units, the system comprising:*

*an ultracapacitor coupled in parallel with the first and second energy storage units;*

*a unidirectional conducting apparatus coupled in a series circuit with the ultracapacitor and poled to conduct current from the ultracapacitor to the load;*

*a switching circuit that connects the first and second energy storage units in a lower voltage parallel arrangement and a higher voltage series arrangement, wherein the switching circuit comprises at least one silicon controlled rectifier;*

*a plurality of sensors configured to sense at least one of a motor speed, a torque command signal provided to the motor, a passive storage device voltage, and an energy storage unit voltage; and*

*a controller coupled to the switching circuit and to the plurality of sensors so as to be in operable communication therewith, the controller comprising a processor programmed to:*

*receive feedback signals from the plurality of sensors indicative of measured values of the at least one of the motor speed, the torque command signal provided to the motor, the passive storage device voltage, and the energy storage unit voltage; and*

*control operation of the switching circuit to connect the first and second energy storage units in either a lower voltage parallel arrangement or a higher voltage series arrangement by sending control signals to the switching circuit, with operation of the switching circuit being based on the feedback signals received by the controller.*

*60. The load leveling system of claim 59 wherein at least one of the first and second energy storage units comprises one of a fuel cell, a sodium nickel chloride battery, a sodium sulfur battery, a lithium ion battery, a nickel metal hydride battery, a lithium polymer battery, a nickel cadmium battery, and a lead acid battery.*

*61. The load leveling system of claim 35 wherein the passive storage device comprises an ultracapacitor.*

* * * * *